(12) United States Patent
Mukai

(10) Patent No.: US 8,970,602 B2
(45) Date of Patent: Mar. 3, 2015

(54) OBJECT OPERATING DEVICE AND METHOD, AND PROGRAM

(75) Inventor: Tomohiko Mukai, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 79 days.

(21) Appl. No.: 13/980,113

(22) PCT Filed: Feb. 13, 2012

(86) PCT No.: PCT/JP2012/053290
§ 371 (c)(1),
(2), (4) Date: Jul. 17, 2013

(87) PCT Pub. No.: WO2012/111621
PCT Pub. Date: Aug. 23, 2012

(65) Prior Publication Data
US 2013/0293538 A1   Nov. 7, 2013

(30) Foreign Application Priority Data

Feb. 16, 2011  (JP) ................................. 2011-031340

(51) Int. Cl.
*G06T 13/00* (2011.01)
*G06T 19/00* (2011.01)
(Continued)

(52) U.S. Cl.
CPC ................ *G06T 19/00* (2013.01); *A63F 13/10* (2013.01); *G06T 13/20* (2013.01); *A63F 2300/646* (2013.01); *A63F 2300/6607* (2013.01)
USPC ......................................................... 345/473

(58) Field of Classification Search
None
See application file for complete search history.

(56) References Cited

U.S. PATENT DOCUMENTS

| 8,237,707 B2 | 8/2012 | Furuhashi et al. |
| 8,432,401 B2 | 4/2013 | Mukai |
| 8,471,850 B2 | 6/2013 | Furuhashi et al. |

(Continued)

FOREIGN PATENT DOCUMENTS

| JP | 2004-030502 | 1/2004 | |
| JP | 2010-237882 | 10/2010 | |
| JP | 2004030502 | * 1/2014 | .............. A63F 13/00 |

OTHER PUBLICATIONS

U.S. Appl. No. 13/982,850 to Tomohiko Mukai, filed Jul. 31, 2013.
(Continued)

*Primary Examiner* — Mark Zimmerman
*Assistant Examiner* — Vu Nguyen
(74) *Attorney, Agent, or Firm* — Greenblum & Bernstein, P.L.C.

(57) ABSTRACT

Motion data to be inserted between two different object actions that include a rotating action and are to be successively performed are generated so that the two actions are smoothly connected. Respective elements d required to define a transitional motion action are calculated from the respective frames after the end point of the former motion and before the start point of the latter motion. As for the three-dimensional rotation R(t) that defines the posture in each frame, independent linear values rx(t), ry(t), and rz(t) are calculated as values approximating the three-dimensional rotation R(t) by using exponential maps. The velocity components of the respective elements d are determined, and the largest value of the absolute values of the velocity components in each of the post-end frames and the pre-start frames is extracted as an interpolating velocity v(t). The respective elements d(t) in each of blended transitional motion frames can be determined.

9 Claims, 6 Drawing Sheets

(51) Int. Cl.
  *A63F 13/40* (2014.01)
  *G06T 13/20* (2011.01)

(56) References Cited

U.S. PATENT DOCUMENTS

| | | |
|---|---|---|
| 2005/0075557 A1 | 4/2005 | Kamiyama |
| 2009/0027386 A1 | 1/2009 | Furuhashi et al. |
| 2010/0097375 A1 | 4/2010 | Tadaishi et al. |
| 2010/0245365 A1 | 9/2010 | Hato et al. |
| 2012/0225717 A1 | 9/2012 | Kuroda et al. |

OTHER PUBLICATIONS

U.S. Appl. No. 13/945,192 to Hiroaki Saotome, filed Jul. 18, 2013.
U.S. Appl. No. 13/945,292 to Hiroaki Saotome, filed Jul. 18, 2013.
International Search Report (ISR) and Written Opinion (WO) in International Application No. PCT/JP2012/053290, dated Mar. 6, 2012.
Office Action from Japan Patent Office (JPO) in Japanese Patent Application No. 2011-031340, dated Dec. 20, 2012, together with an English language translation thereof.

* cited by examiner

OBJECT OPERATING DEVICE AND METHOD, AND PROGRAM

TECHNICAL FIELD

The present invention relates to an object operating device that blends motion data for naturally connecting two different object actions that are successively performed.

BACKGROUND ART

A technique for generating data by operating objects such as characters existing in a virtual three-dimensional space and performing perspective transformation on actions of the objects with a virtual camera has been widely used in three-dimensional video games. When two different actions are successively performed, the motion data of those different actions are blended during the transition from the former action to the latter action, to faithfully reproduce the actions of an object. The object is operated based on the blended motion data, so that the transition between the actions appears natural.

As the technique that is often used for blending such motion data, there has been a technique of blending the motion data related to the former action and the latter action while gradually varying the mixing ratio between the motion data related to the actions during the period in which those actions overlap with each other. Specifically, the motion combination ratio (motion blending ratio) is determined from the angles of rotation about the X-axis and the Y-axis, and reference actions are combined at the determined motion combination ratio, to generate motion data of a character. Based on the generated motion data, the character is operated (Patent Literature 1). According to some other method, the transition between two different actions is made to appear natural by spline interpolation.

CITATION LIST

Patent Literature

Patent Literature 1: JP 2010-237882A (paragraph 0118 etc.)

SUMMARY OF INVENTION

Technical Problem

However, the technique disclosed in Patent Literature 1 is a technique for combinations featuring the shapes of models defined by angles of rotation and the like. If the motion data related to the former and latter actions contains different velocity features of moves or rotations in each motion data, the velocity features have to be ignored. Also, in the overlapping frame periods in which the motion data of the former and latter actions are blended, there is a need to set the method of calculating the motion data mixing ratio that is gradually varied. Furthermore, if the overlapping frame periods of the motion data are short, the motion data blending is difficult to be performed.

Meanwhile, in a case where the transition between two different actions is expressed by spline interpolation, the motion data blending can be performed even if the motion data overlapping frame periods required for the transition while the above described mixing ratio is gradually varied are short, or even if there are not overlaps. However, when a spline curve is applied to the data of the positions and angles of the former and latter actions, selecting the type of the curve and optimizing the parameters for the curve become troublesome. Also, as for the spline interpolation, the velocity features in the movement and rotation in the former and latter different actions are ignored. In either case, the boundary between the motions needs to be smoothened and hidden to perform the transition between actions.

The present invention aims to provide an object operating device and the like that generates motion data to be inserted between two different object actions so that the two actions, which contain a rotating action and are to be successively performed, are smoothly connected.

Solution to Problem

To achieve the above object, an object operating device according to a first aspect of the present invention is characterized as an object operating device that causes an object to perform a second action after performing a first action different from the second action, the object existing in a virtual three-dimensional space, a three-dimensional rotating action being contained in at least one of the first action and the second action. The object operating device includes: a motion data storage that stores first motion data formed with data of a plurality of unit times and second motion data formed with data of a plurality of unit times, the first motion data defining the first action, the second motion data defining the second action; a first motion data setter that sets data of an end point until which the object is made to act in accordance with the first motion data, the data of the end point being of the data of the plurality of unit times forming the first motion data; a second motion data setter that sets data of a start point from which the object is made to act in accordance with the second motion data, the data of the start point being of the data of the plurality of unit times forming the second motion data; an interpolating motion data generator that generates motion data, the motion data being data of a plurality of unit times inserted between the end point until which the object is made to act in accordance with the first motion data and the start point from which the object is made to act in accordance with the second motion data; and an object operator that operates the object by using the data of the respective unit times of the first motion data until the end point, the data of the unit times generated by the interpolating motion data generator, and the data of the respective unit times of the second motion data from the start point, wherein the interpolating motion data generator includes: a rotation specifier that specifies a rotation in a three-dimensional rotating action of the object acting in accordance with the first motion data and a rotation in a three-dimensional rotating action of the object acting in accordance with the second motion data in each unit time of the plurality of unit times inserted between the end point and the start point; a rotation decomposer that decomposes the rotation specified by the rotation specifier in each unit time of the three-dimensional rotating action of the object acting in accordance with the first motion data into scalar rotations, and decomposes the rotation specified by the rotation specifier in each unit time of the three-dimensional rotating action of the object acting in accordance with the second motion data into scalar rotations, respectively; a scalar velocity calculator that calculates a scalar velocity in each unit time of the three-dimensional rotating action of the object acting in accordance with the first motion data and a scalar velocity in each unit time of the three-dimensional rotating action of the object acting in accordance with the second motion data, based on the scalar rotations, which are obtained through the decomposition by the rotation decomposer in each unit time when the object acts in accordance with the first motion data, and the scalar rotations, which are obtained through the decomposition by the rotation decomposer in each unit time when the object acts in accordance with the second motion data, respectively; a scalar velocity specifier that specifies a scalar velocity in each unit time of the three-dimensional rotating action of the object, the scalar velocity being applied in the plurality of unit times inserted between the end point and the start point, based on the scalar velocity calculated by the scalar velocity calculator in each unit time when the object acts in accordance with the first motion data, and the scalar velocity calculated by the scalar velocity calculator in each unit time when the object acts in accordance with the second motion data; a scalar rotation calculator that calculates scalar rotations regarding the three-dimensional rotating action of the object, the scalar rotations being applied in each unit time of the plurality of unit times inserted between the end point and the start point, by performing a predetermined arithmetic operation on the scalar velocity specified by the scalar velocity specifier in each unit time; and a rotation regenerator that regenerates rotations of the object, the rotations being applied in each unit time of the plurality of unit times inserted between the end point and the start point, based on the scalar rotations calculated by the scalar rotation calculator.

In the above described object operating device according to the first aspect, the scalar rotation calculator may perform a matrix operation as the predetermined arithmetic operation, using a predetermined matrix. Here, the matrix operation using the predetermined matrix may be an arithmetic operation by means of the Poisson's equation.

In the above described object operating device according to the first aspect, when calculating the scalar rotations to be applied in each unit time of the plurality of unit times inserted between the end point and the start point, the scalar rotation calculator may perform the arithmetic operation using only the Xth row in the predetermined matrix for the Xth element of the scalar velocity.

In the above described object operating device according to the first aspect, the rotation decomposer may decompose the rotation of the three-dimensional rotating action of the object into scalar rotations by using exponential maps, and the rotation regenerator may regenerate the rotation of the object based on the scalar rotations by using logarithmic maps.

In the above described object operating device, the object existing in the virtual three-dimensional space is made to perform the first action defined by the first motion data until the set end point, and is made to perform the second action defined by the second motion data from the set start point. Here, in the period of the transition from the first action to the second action, the data of the unit times generated by the interpolating motion data generator is inserted as motion data.

Meanwhile, a three-dimensional rotating action is contained in at least one of the first action and the second action. The data of the three-dimensional rotating action is non-linear data, and therefore, it is not easy to generate the motion data in the period of the transition from the first action to the second action so that the first motion data and the second motion data are naturally and smoothly connected, such non-linear data being contained in at least one of the first motion data and the second motion data.

In the above described object operating device, the rotation of the three-dimensional rotating action is specified in each unit time, and is decomposed into respective scalar rotations. The scalar velocity is specified from the decomposed scalar rotations in each unit time, and the scalar rotations are further calculated. Based on the calculated scalar rotations, the object rotation to be applied in each of the unit times of the plurality of the unit times inserted between the end point until which the object acts in accordance with the first motion data and the start point from which the object acts in accordance with the second motion data is regenerated in the motion data of the transition from the first action to the second action.

The motion data of the plurality of the unit times inserted between the end point until which the object acts in accordance with the first motion data and the start point from which the object acts in accordance with the second motion data are generated by the above technique as a calculation using linear data. Accordingly, it becomes relatively easy to generate the motion data in the transition from the first action to the second action so that the first motion data and the second motion data are naturally and smoothly connected, a rotating action being contained in at least one of the first action and the second action.

The predetermined arithmetic operation for calculating the scalar rotations is made simpler by using a predetermined matrix operation, such as an operation by means of the Poisson's equation. Moreover, a processing load for an arithmetic operation can be reduced by using only the Xth row of the predetermined matrix for the Xth element of the scalar velocity to perform the operation to calculate the scalar rotations. Further, the decomposition into the scalar rotations and the regeneration of the rotation of the object can be made relatively simple by applying exponential maps to the decomposition into the scalar rotations, and logarithmic maps to the regeneration of the rotation of the object.

In the above described object operating device according to the first aspect, the first action and the second action each contain a three-dimensional rotating action, and the scalar velocity specifier compares the scalar velocity in each unit time when the object acts in accordance with the first motion data calculated by the scalar velocity calculator, with the scalar velocity calculated by the scalar velocity calculator in each unit time when the object acts in accordance with the second motion data, the comparison being made in each corresponding unit time, and the scalar velocity having the larger absolute value may be specified as the scalar velocity in each unit time in the three-dimensional rotating action of the object, the scalar velocity being applied in the unit times inserted between the end point and the start point.

As described above, the scalar velocity having the larger absolute value in each unit time is specified as the scalar velocity in each of the unit times inserted between the end point until which the object acts in accordance with the first motion data and the start point from which the object acts in accordance with the second motion data. Accordingly, the motion data in the transition from the first action to the second action can be generated so that the first motion data and the second motion data can be naturally and smoothly connected.

The above described object operating device according to the first aspect may further include: an approximate data specifier that specifies data of unit times most similar to each other by comparing the data of unit times after the end point of the data of the plurality of unit times forming the first motion data with the data of unit times before the start point of the data of the plurality of unit times forming the second motion data; and a time shifter that causes time shifts to the first motion data and the second motion data in order to match the data of the unit times with each other, the data of the unit times having been specified by the approximate data specifier. In this object operating device, the interpolating motion data generator may generate the data of the plurality of unit times inserted between the end point until which the object is made to act in accordance with the first motion data and the start point from which the object is made to act in accordance with the second motion data, the data generation being performed based on the first motion data and the second motion data caused the time shifts on each of them by the time shifter.

In this case, the data in each unit time of the plurality of unit times inserted between the end point until which the object is made to act in accordance with the first motion data and the start point from which the object is made to act in accordance with the second motion data contain data generated based on the data most similar to each other between the data of the respective unit times contained in the first motion data and the data of the respective unit times contained in the second motion data, or the data with the smallest difference from both of the first motion data and the second motion data. Accordingly, the motion data of the transition from the first action to the second action can be generated so that the first motion data and the second motion data are naturally and smoothly connected.

To achieve the above object, an object operating method according to a second aspect of the present invention is characterized as an object operating method for causing an object to perform a second action after performing a first action different from the second action in a computer device, the object existing in a virtual three-dimensional space, a three-dimensional rotating action being contained in at least one of the first action and the second action. The object operating method includes: a first step of storing first motion data formed with data of a plurality of unit times and second motion data formed with data of a plurality of unit times beforehand into the computer device, the first motion data defining the first action, the second motion data defining the second action; a second step of setting data of an end point until which the object is made to act in accordance with the first motion data, the data of the end point being of the data of the plurality of unit times forming the first motion data; a third step of setting data of a start point from which the object is made to act in accordance with the second motion data, the data of the start point being of the data of the plurality of unit times forming the second motion data; a fourth step of generating motion data, the motion data being data of a plurality of unit times inserted between the end point until which the object is made to act in accordance with the first motion data and the start point from which the object is made to act in accordance with the second motion data; and a fifth step of operating the object by using the data of the respective unit times of the first motion data until the end point, the generated data of the respective unit times, and the data of the respective unit times of the second motion data from the start point, wherein the fourth step includes: the step of specifying a rotation in a three-dimensional rotating action of the object acting in accordance with the first motion data and a rotation in a three-dimensional rotating action of the object acting in accordance with the second motion data in each unit time of the plurality of unit times inserted between the end point and the start point, respectively; the step of decomposing the rotation in each unit time of the three-dimensional rotating action of the object acting in accordance with the first motion data and the rotation in each unit time of the three-dimensional rotating action of the object acting in accordance with the second motion data into scalar rotations, respectively; the step of calculating a scalar velocity in each unit time of the three-dimensional rotating action of the object acting in accordance with the first motion data and a scalar velocity in each unit time of the three-dimensional rotating action of the object acting in accordance with the second motion data, based on the scalar rotations in each unit time when the object acts in accordance with the first motion data and the scalar rotations in each unit time when the object acts in accordance with second motion data; the step of specifying a scalar velocity in each unit time of the three-dimensional rotating action of the object, the scalar velocity being applied in the plurality of unit times inserted between the end point and the start point, based on the scalar velocity in each unit time when the object acts in accordance with the first motion data and the scalar velocity in each unit time when the object acts in accordance with the second motion data; the step of calculating scalar rotations regarding the three-dimensional rotating action of the object, the scalar rotations being applied in in each unit time of the plurality of unit times inserted between the end point and the start point, by performing a predetermined arithmetic operation on the scalar velocity in each unit time; and the step of regenerating a rotation of the object to be applied in each unit time of the plurality of unit times inserted between the end point and the start point, based on the scalar rotations.

To achieve the above object, a program according to a third aspect of the present invention is characterized as a program that causes an object to perform a second action after performing a first action different from the second action in a computer device, the object existing in a virtual three-dimensional space, a three-dimensional rotating action being contained in at least one of the first action and the second action. The program causes the computer device to function as: a motion data storage that stores first motion data formed with data of a plurality of unit times and second motion data formed with data of a plurality of unit times beforehand into the computer device, the first motion data defining the first action, the second motion data defining the second action; a first motion data setter that sets data of an end point until which the object is made to act in accordance with the first motion data, the data of the end point being of the data of the plurality of unit times forming the first motion data; a second motion data setter that sets data of a start point from which the object is made to act in accordance with the second motion data, the data of the start point being of the data of the plurality of unit times forming the second motion data; an interpolating motion data generator that generates motion data, the motion data being data of a plurality of unit times inserted between the end point until which the object is made to act in accordance with the first motion data and the start point from which the object is made to act in accordance with the second motion data; and an object operator that operates the object by using the data of the respective unit times of the first motion data until the end point, the data of the unit times generated by the interpolating motion data generator, and the data of the respective unit times of the second motion data from the start point, wherein the interpolating motion data generator includes: a rotation specifier that specifies a rotation in a three-dimensional rotating action of the object acting in accordance with the first motion data and a rotation in a three-dimensional rotating action of the object acting in accordance with the second motion data in each unit time of the plurality of unit times inserted between the end point and the start point; a rotation decomposer that decomposes the rotation specified by the rotation specifier in each unit time of the three-dimensional rotating action of the object acting in accordance with the first motion data into scalar rotations, and decomposes the rotation specified by the rotation specifier in each unit time of the three-dimensional rotating action of the object acting in accordance with the second motion data into scalar rotations, respectively; a scalar velocity calculator that calculates a scalar velocity in each unit time of the three-dimensional rotating action of the object acting in accordance with the first motion data and a scalar velocity in each unit time of the three-dimensional rotating action of the object acting in accordance with the second motion data, based on the scalar rotations, which are obtained through the decomposition by the rotation decomposer in each unit time when the object acts in accordance with the first motion data, and the scalar rotations, which are obtained through the decomposition by the rotation decomposer in each unit time when the object acts in accordance with the second motion data, respectively; a scalar velocity specifier that specifies a scalar velocity in each unit time of the three-dimensional rotating action of the object, the scalar velocity being applied in the plurality of unit times inserted between the end point and the start point, based on the scalar velocity calculated by the scalar velocity calculator in each unit time when the object acts in accordance with the first motion data, and the scalar velocity calculated by the scalar velocity calculator in each unit time when the object acts in accordance with the second motion data; a scalar rotation calculator that calculates scalar rotations regarding the three-dimensional rotating action of the object, the scalar rotations being applied in each unit time of the plurality of unit times inserted between the end point and the start point, by performing a predetermined arithmetic operation on the scalar velocity specified by the scalar velocity specifier in each unit time; and a rotation regenerator that regenerates rotations of the object, the rotations being applied in each unit time of the plurality of unit times inserted between the end point and the start point, based on the scalar rotations calculated by the scalar rotation calculator.

The above described program according to the third aspect can be recorded on a computer readable recording medium, and be then provided. This computer readable recording medium may be a recording medium that is detachably provided in the above described computer device and is provided independently of the above described computer device. This computer readable recording medium may be a recording medium such as a fixed disk device that is installed in the above described computer device and is provided together with the above described computer device. The above described program according to the third aspect may be distributed from a server device existing in a network to the above described computer device via the network, with the data signals of the program being superimposed on carrier waves.

Also, a method of carrying out the procedures of the respective steps included in the above described program according to the third aspect is also within the scope of the present invention.

DESCRIPTION OF EMBODIMENTS

Figure 1:
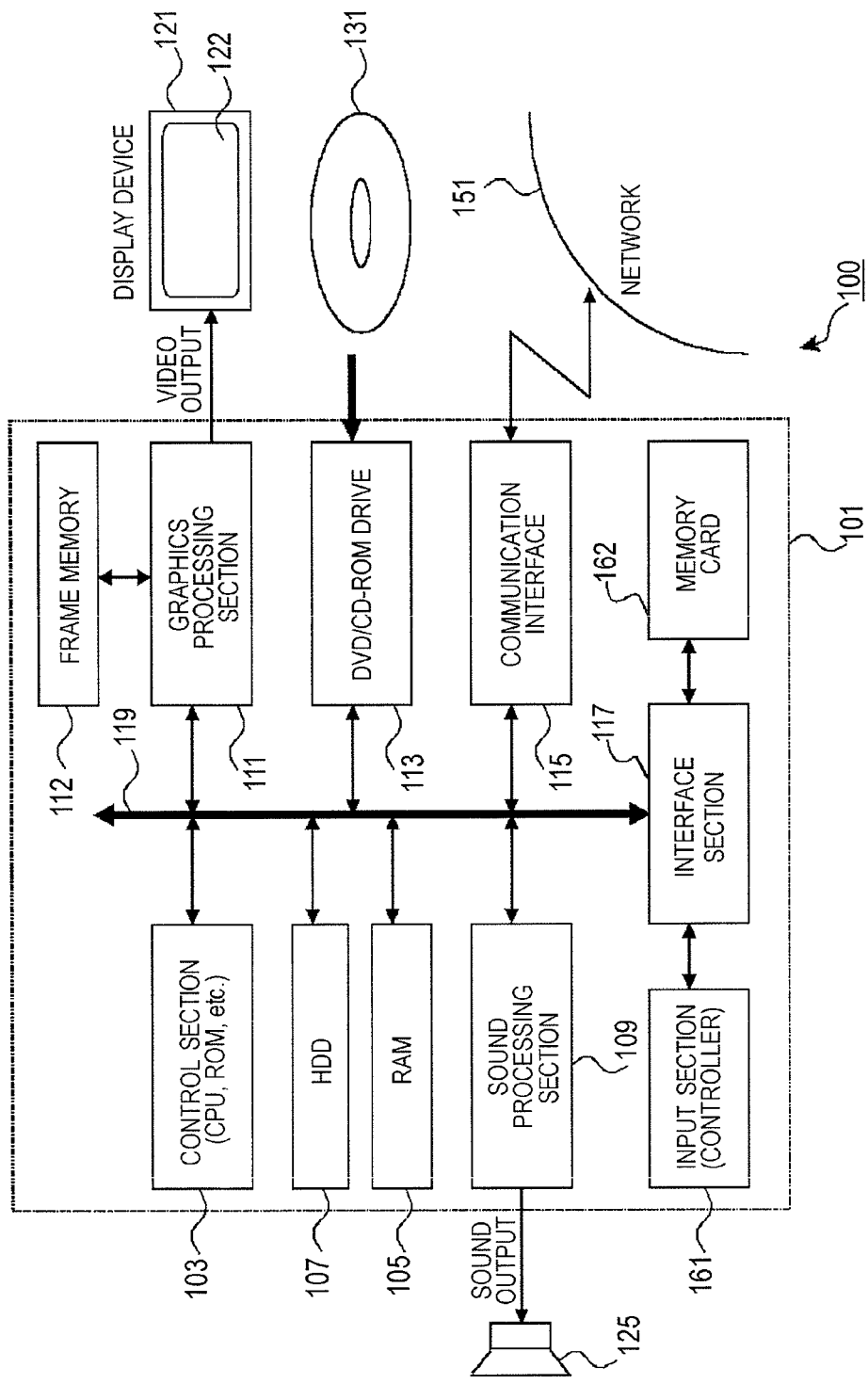
FIG. 1 is a block diagram showing the structure of a video game apparatus to which an embodiment of the present invention is applied.

FIG. 1 is a block diagram showing the structure of a video game apparatus to which this embodiment is applied. As shown in the game apparatus 100 is constructed around an apparatus body 101. The apparatus body 101 includes a control section 103, a RAM (Random Access Memory) 105, a hard disk drive (HDD) 107, a sound processing section 109, a graphics processing section 111, a DVD/CD-ROM drive 113, a communication interface 115, and an interface section 117 that are connected to an internal bus 119.

The sound processing section 109 of this apparatus body 101 is connected to a sound output device 125 that is a speaker, and the graphics processing section 111 is connected to a display device 121 that has a display screen 122. The DVD/CD-ROM drive 113 can have a recording medium (a DVD-ROM or a CD-ROM in this embodiment) 131 mounted thereon. The communication interface 115 is connected to a network 151. The interface section 117 has an input section (controller) 161 and a memory card 162 connected thereto.

The control section 103 includes a CPU (Central Processing Unit), a ROM (Read Only Memory), and the like, and executes a program stored in the HDD 107 or the recording medium 131, to control the apparatus body 101. The control section 103 includes an internal timer. The RAM 105 is a work area of the control section 103, and the later described information about the basic actions and the like of a player character is temporarily stored in the RAM 105. The HDD 107 is a storage area for storing a program and the data about the basic actions and the like of the player character. When the program being executed by the control section 103 issues a sound output instruction, the sound processing section 109 interprets the instruction, and outputs a sound signal to the sound output device 125.

In accordance with a draw command that is output from the control section 103, the graphics processing section 111 loads image data into a frame memory 112 (although shown at the outside of the graphics processing section 111, it is provided in the RAM contained in the chip constructing the graphics processing section 111), and outputs a video signal for displaying an image on the display screen 122 of the display device 121. The 1-frame time of the image contained in the video signal that is output from the graphics processing section 111 is 1/60 second, for example. Two sets of the frame memories 112 are provided, and, for each frame period, the frame memory being used is switched between the one for data writing and the one for data reading.

The graphics processing section 111 generates the image data of two-dimensional images formed by perspective transformation of objects (the player character, non-player characters, and objects other than the characters) existing in a virtual three-dimensional space, and writes the image data into the frame memory 112.

The DVD/CD-ROM drive 113 reads a program and data from the recording medium 131. The communication interface 115 is connected to the network 151, and performs communication with other computers. The input section 161 includes cursor keys and operation buttons. The position of the player character in the virtual three-dimensional space is moved in accordance with an instruction that is input through the cursor keys of the input section 161.

The interface section 117 outputs data input from the input section 161 to the RAM 105, and the control section 103 interprets the data and performs an arithmetic operation. In accordance with an instruction from the control section 103, the interface section 117 puts the data indicating progress of a game stored in the RAM 105 into the memory card 162, and reads the data of a suspended game stored in the memory card 162 to transfer the data to the RAM 105.

The program and data for playing a game on the video game apparatus 100 are first stored in the recording medium 131, for example. The data stored in the recording medium 131 contains the graphics data for forming the objects existing in the game space (the virtual three-dimensional space), and the data about the basic actions and the like of the player character. The program and data stored in the recording medium 131 are read by the DVD/CD-ROM drive 113 at the time of execution, and are loaded into the RAM 105. The control section 103 processes the program and data loaded into the RAM 105, outputs a draw command to the graphics processing section 111, and outputs a sound output instruction to the sound processing section 109. Intermediate data generated while the control section 103 is performing the processing are stored into the RAM 105.

In a video game according to this embodiment, three-dimensional objects exist in the virtual three-dimensional space that serves as the game space, and images formed by perspective transformation of those objects with the virtual camera are displayed as game images on the display screen 122 of the display device 121. The objects existing in the virtual three-dimensional space include the player character that is operated through inputs from the input section 161 of the player, non-player characters (operated by the control section 103) that are characters other than the player character, and non-character objects that exist in the virtual three-dimensional space and do not move, such as terrains and buildings.

The player is allowed to perform various different operations related to movement of the arms and movement of the legs of the player character, such as walking, running, sitting down, standing up, throwing, and the like as the basic actions of the player character. Those basic actions are each defined by data related to the three-dimensional position P(t) and the three-dimensional rotation R(t) that determine the posture in each frame. The data related to the three-dimensional position P(t) and the three-dimensional rotation R(t) are stored as motion data forming part of the program of the game into the recording medium 131, and are transferred to the HDD 107 and the like.

Actions that cannot be expressed by the basic actions are generated as the next described complex actions or transitional actions by blending the basic actions. A complex action is generated by blending the data related to two different basic actions that are performed at the same time. A complex action is generated by blending the data related to two different basic actions that are performed at the same time, such as a running action and a throwing action, or a walking action and a throwing action, or the data of an intermediate-speed running action are generated by motion blending of the data about a low-speed running action and a high-speed running action. This blending is not directly relevant to the present invention, and therefore, is not described in detail herein.

Meanwhile, a transitional action is an action that bridges the gap between two different basic actions that are successively performed, and is generated so that the transition from the former basic action to the latter basic action is smoothly made. Also, a transitional action is generated to bridge the gap between two different basic actions that are successively performed in a series of actions in progress of the game, as in a case where the player character is switched from a walking state to a running state, or is switched from a running state to a walking state.

Figure 2:
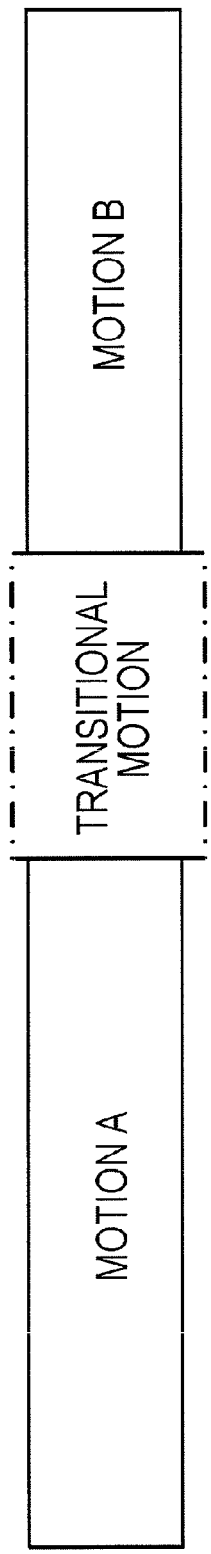
FIG. 2 is a diagram schematically showing a flow of operations that are performed when a transitional action is formed through blending.

In such a transitional action that follows the former action to bridge the gap between two different actions that are successively performed in a series of actions, a transitional motion that is generated by blending (motion blending) the former and latter actions (motions) is executed following the former action to eliminate artificiality in the transition to the latter action and to avoid a sudden change in action, and the transition to the next action is made, as shown in FIG. 2. In the following, the motion blending for the transitional action used in this embodiment is described.

Figure 3:
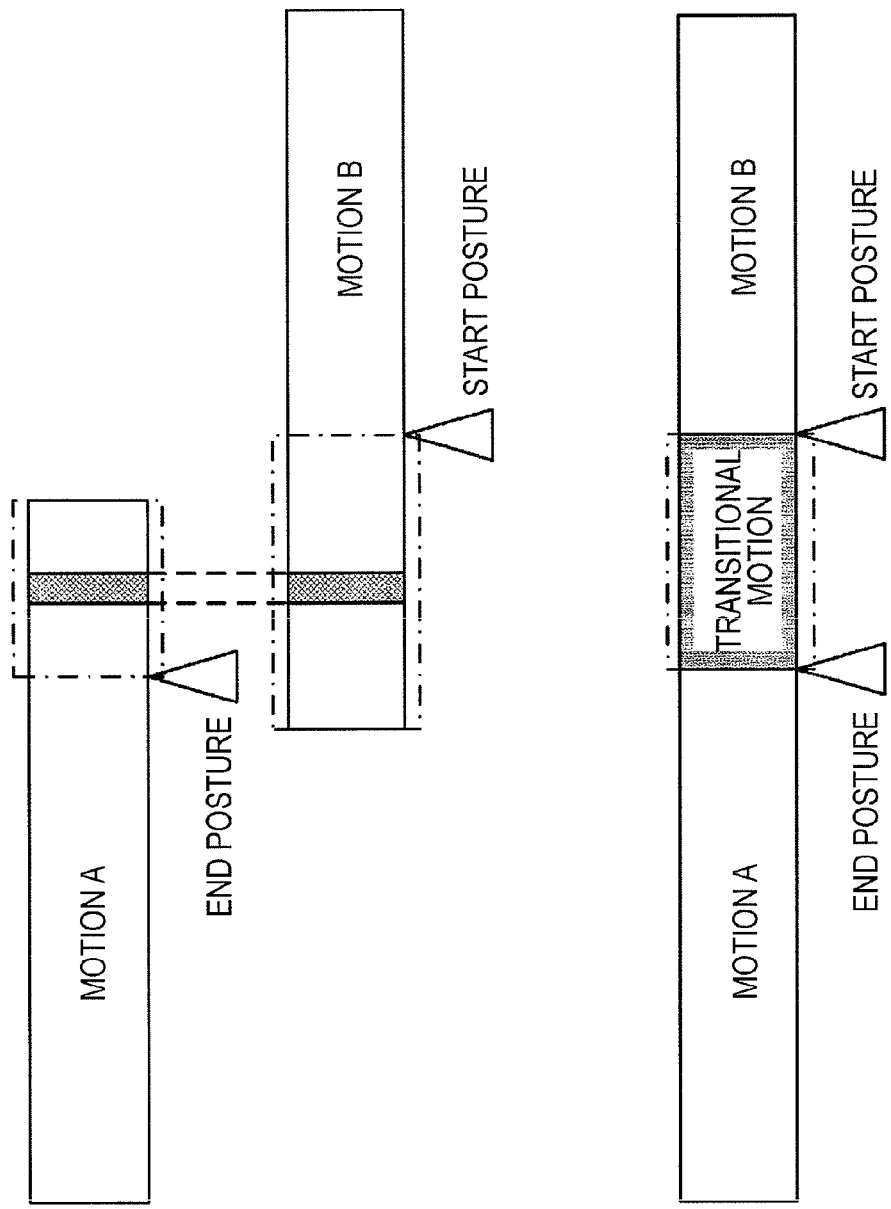
FIG. 3 is a diagram schematically showing the setting of timing for post-end frames and pre-start frames.

First, as shown in FIG. 3, as for two different basic actions (hereinafter referred to simply as motions) stored in the HDD 107 or the like, a frame that shows the end posture of the former motion (hereinafter referred to as the motion A) of the two motions to be successively performed is set (hereinafter referred to as the end frame), and a frame that shows the start posture of the latter motion (hereinafter referred to as the motion B) is set (hereinafter referred to as the start frame).

The end posture of the motion A and the start posture of the motion B may be set by using a conventional technique. For example, the end posture of the former motion and the start posture of the latter motion may be determined beforehand by the programmer for each combination of motions to be successively executed, and the predetermined end posture and start posture may be automatically set when the two motions to be successively executed are determined.

At the time of motion blending, the data of respective frames after the frame showing the end posture (hereinafter referred to as the post-end frames) among the motion data related to the motion A, and the data of respective frames before the frame showing the start posture (hereinafter referred to as the pre-start frames) among the motion data related to the motion B are searched in a brute force manner for the frames most similar to each other. The brute force search for the frames may be conducted by using a conventional technique such as pattern matching, and therefore, is not described in detail herein.

If the most similar frames (the shaded area of the post-end frames of the motion A and the shaded area of the pre-start frames of the motion B in FIG. 3) between the post-end frames and the pre-start frames are detected, the time to execute the motion B with respect to the motion A is set so that the timing for the most similar frame among the pre-start frames coincides with the timing for the most similar frame among the post-end frames, as shown in FIG. 3. In the period from the end-posture frame of the motion A to the start-posture frame of the motion B, which is set in the above manner, the motion related to the post-end frames and the motion related to the pre-start frames are blended, to generate the motion data related to the transitional motion. It should be noted that blending of the motions existing between the end frame of the motion A and the start frame of the motion B will be described later in detail.

As described above, when the player character is made to perform the action of the motion B after performing the action of the motion A, the player character is made to act by using the motion data related to the motion A until the end posture that is set in the above manner, the motion data related to the transitional motion generated by blending, and the motion data related to the motion B from the start posture that is set in the above described manner during each frame of the these motions.

In the motion blending according to this embodiment, velocity components are calculated from the data related to the three-dimensional position P(t) and the three-dimensional rotation R(t) that determine the posture in the post-end frames and the pre-start frames that determine the two motions to be successively executed. Based on the calculated velocity components of the respective motions, the motion blending is performed.

The Poisson's equation is applied to the velocity components of the blended motions, to determine the data related to the three-dimensional position P(t) and the three-dimensional rotation R(t) that determine the posture of the player character in each frame of the blended motions. In doing so, the velocity components of the three-dimensional position P(t) and the three-dimensional rotation R(t) that determine the posture of the player character in each of the post-end frames of the motion A and the pre-start frames of the motion B are first calculated prior to the motion blending.

Here, to represent a position in a virtual three-dimensional space, the three-dimensional position P(t) has linear values px(t), py(t), and pz(t), which are independent of one another. While the Poisson's equation can be applied directly to the three-dimensional position P(t), the three-dimensional rotation R(t), which is non-linear, cannot represent absolute values, and the Poisson's equation cannot be applied directly to the three-dimensional rotation R(t). In order to apply the Poisson's equation to the three-dimensional rotation R(t), exponential maps are applied to the three-dimensional rotation R(t) determining the posture of the player character, and linear numerical values are approximated.

The application of exponential maps to the three-dimensional rotation R(t) is now described. Since the three-dimensional rotation R(t) cannot represent absolute values, exponential maps are applied to determine rotations relative to a reference rotation. In order to express the relative amounts rx(t), ry(t), and rz(t) of the three-dimensional rotation R(t), the mean rotation Rm in the respective frame periods subjected to blending of the former and the latter motions is calculated as the reference rotation. For example, as for three-dimensional rotations R1 and R2 in two frames, the mean rotation Rm and rx(t), ry(t), and rz(t) are expressed as follows.

$$Rm = \mathrm{mean}(R1, R2)$$

$$R1 \rightarrow (R1-Rm) \rightarrow \mathrm{Expmap}[rx1, ry1, rz1]$$

$$R2 \rightarrow (R2-Rm) \rightarrow \mathrm{Expmap}[rx2, ry2, rz2] \quad \text{Math. 1}$$

The mean rotation Rm is also used to transform rx(t), ry(t), and rz(t) of motions blended by applying logarithmic maps, back into the three-dimensional rotation R(t). The calculation of the mean rotation Rm and the specific calculation methods using exponential maps and logarithmic maps are not directly relevant to this invention, and therefore, are not described herein.

Figure 4:
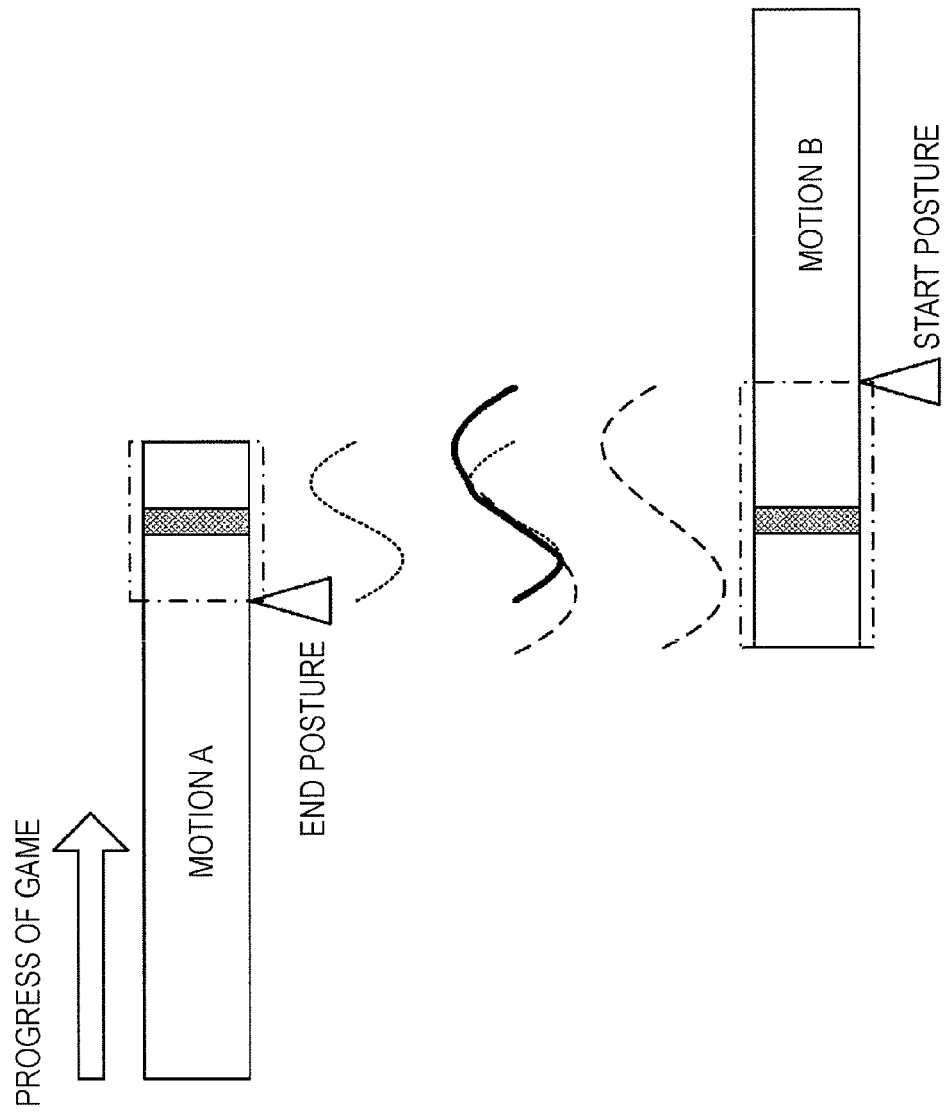
FIG. 4 is a diagram schematically showing extraction of an interpolating velocity.

Differential equations are applied to rx(t), ry(t), and rz(t) related to the three-dimensional rotation R(t), which are determined in the above described exponential map expression, and px(t), py(t), and pz(t) related to the three-dimensional position P(t). In this manner, the respective velocity components are calculated. Thus, for each of the determined velocity components of the three-dimensional position P(t) and the three-dimensional rotation R(t), the largest value of the absolute value of each velocity component in each frame is extracted from the post-end frames and the pre-start frames of the motion data related to blended two different motions for which the timing for execution has already been set, as shown in FIG. 4.

Figure 5:
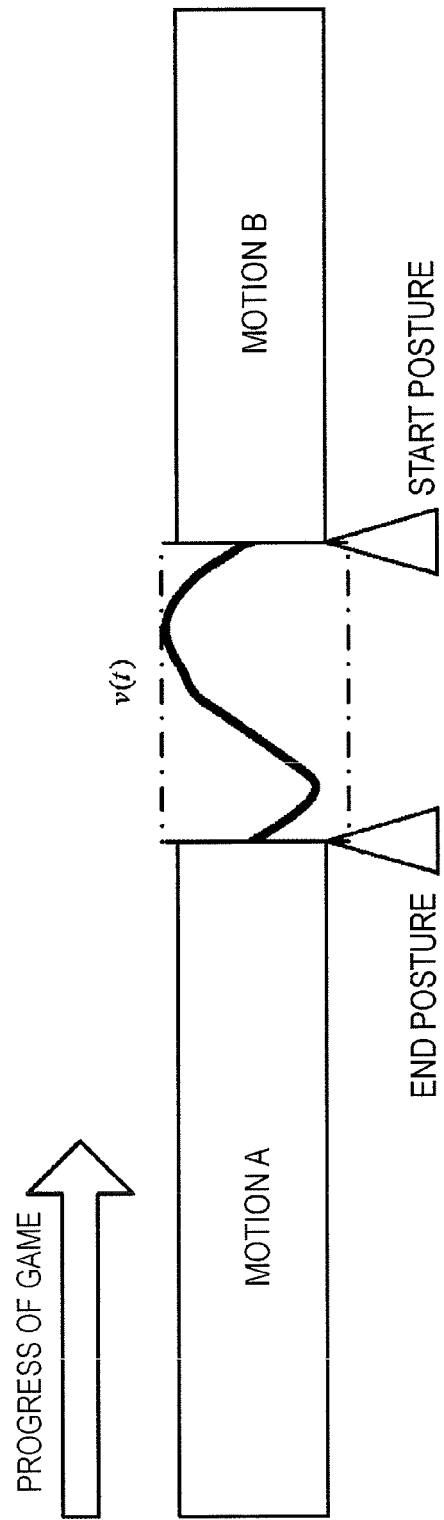
FIG. 5 is a diagram schematically showing an interpolating velocity curve applied to the transitional motion.

This is set as an interpolating velocity v(t) (common to the velocity components of the respective elements of the three-dimensional position P(t) and the three-dimensional rotation R(t) herein), and the interpolating velocity v(t) is set as the velocity component of each element of the three-dimensional position P(t) and the three-dimensional rotation R(t) applied to the transitional motion executed during the period from the end posture of the motion A till the start posture of the motion B, as shown in FIG. 5. The Poisson's equation is then applied to the interpolating velocity v(t), to determine the respective elements px(t), py(t), pz(t), rx(t), ry(t), and rz(t) (hereinafter collectively referred to as the elements d(t)) related to the three-dimensional position P(t) and the three-dimensional rotation R(t) of each frame in the blended motion. It should be noted that the above mentioned logarithmic maps need to be applied to rx(t), ry(t), and rz(t), which have been determined by using the Poisson's equation with respect to the three-dimensional rotation R(t).

The relation between the elements d(i), to which the Poisson's equation has been applied, and the interpolating velocity v(i) can be expressed as follows.

$$\begin{bmatrix} 2 & -1 & & & \\ -1 & 2 & -1 & & \\ & -1 & 2 & -1 & \\ & & -1 & 2 & -1 \\ & & & -1 & 2 \end{bmatrix} \begin{bmatrix} d_1 \\ d_2 \\ d_3 \\ d_4 \\ d_5 \end{bmatrix} = \begin{bmatrix} d_1 - v_1 \\ v_1 - v_2 \\ v_2 - v_3 \\ v_3 - v_4 \\ v_4 + d_5 \end{bmatrix} \quad \text{Math. 2}$$

According to this equation, the elements d(i) can be expressed as follows by using an iterative solution technique (such as the Gauss-Seidel method) for simultaneous equations.

$$\begin{bmatrix} d_1 \\ d_2 \\ d_3 \\ d_4 \\ d_5 \end{bmatrix} = \begin{bmatrix} 2 & -1 & & & \\ -1 & 2 & -1 & & \\ & -1 & 2 & -1 & \\ & & -1 & 2 & -1 \\ & & & -1 & 2 \end{bmatrix}^{-1} \begin{bmatrix} d_1 - v_1 \\ v_1 - v_2 \\ v_2 - v_3 \\ v_3 - v_4 \\ v_4 + d_5 \end{bmatrix} \quad \text{Math. 3}$$

In the above expression, the respective elements d of the matrix are orderly determined, and the inverse matrix can be analytically calculated (see Math. 5 below). Also, in calculating the elements d(i), only the ith row of the inverse matrix is required. The matrix applied in Math. 2 can be generalized in the following manner, and accordingly, the general formula for the inverse matrix used in Math. 3 can also be determined in the following manner.

$$M \in R^{N \times N}, \quad \text{Math. 4}$$

$$M_{ij} = \begin{cases} 2 & i = j \\ -1 & |i-j| = 1 \\ 0 & \text{otherwise} \end{cases} \quad M_{5 \times 5} = \begin{bmatrix} 2 & -1 & & & \\ -1 & 2 & -1 & & \\ & -1 & 2 & -1 & \\ & & -1 & 2 & -1 \\ & & & -1 & 2 \end{bmatrix}$$

$$M_{ij}^{-1} = \frac{\min(i, j)(N - \max(i, j) + 1)}{N + 1} \quad \text{Math. 5}$$

According to the determined general formula (Math. 5), the elements d(i) can be calculated simply by the four arithmetic operations, and the elements d can be calculated independently of one another.

Figure 6:
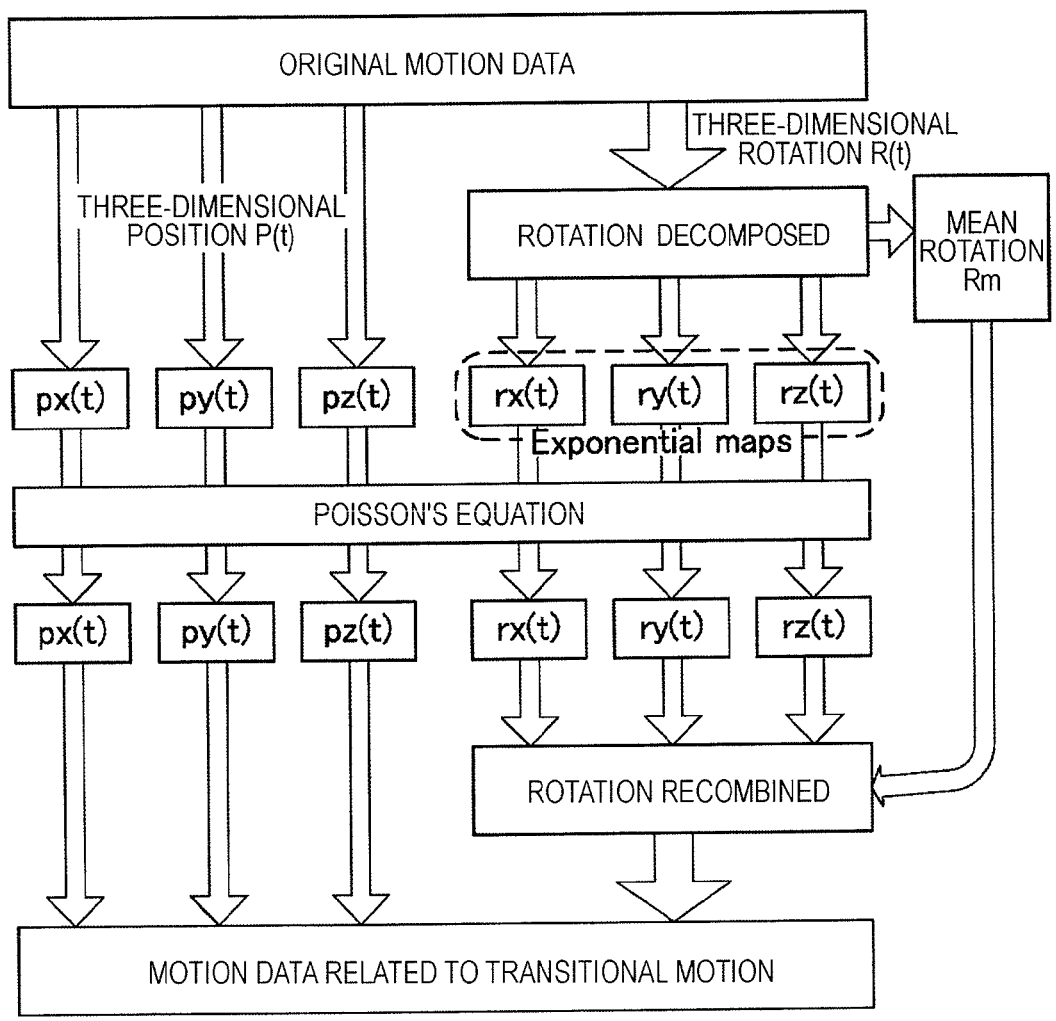
FIG. 6 is a diagram schematically showing the generation of motion data related to the transitional motion by applying the Poisson's equation.

FIG. 6 schematically shows the flow of operations to generate the motion data related to the transitional motion from the end posture to the start posture through blending, with the post-end frames of the motion data related to the motion A and the pre-start frames of the motion data related to the motion B, by applying the Poisson's equation. As shown in the drawing, in each of the motion data of the motion A and the motion B prior to the blending, the data related to the three-dimensional position P(t) is linear numerical values. Accordingly, the Poisson's equation can be directly applied.

Since the three-dimensional rotation R(t) is non-linear numerical values, the Poisson's equation cannot be directly applied. In view of this, exponential maps are applied to the three-dimensional rotation R(t), so that three-dimensional rotation R(t) is decomposed into rx(t), ry(t), and rz(t), which represent independent linear rotations. Based on those values, the Poisson's equation is applied. As for rx(t), ry(t), and rz(t), which are obtained by applying the Poisson's equation, the mean rotation Rm used for the decomposition into the linear rotations is again used to regenerate a three-dimensional rotation, so as to represent the three-dimensional rotation R(t) related to the motion data of the transitional motion.

As described above, after the player character existing in a virtual three-dimensional space is made to perform the action defined by the motion data related to the motion A until taking the end posture, the player character is made to start the action defined by the motion data related to the motion B from the start posture. Here, during the transition from the motion A to the motion B, the player character is operated according to the motion data related to the transitional motion generated through blending.

At least one of the actions of the motion A and the motion B includes an action related to a three-dimensional rotation R. The data of the action related to the three-dimensional rotation R is non-linear data, and it is not easy to generate the motion data of the transition from the motion A to the motion B so that the motion data related to the motion A and the motion data related to the motion B, which contain such non-linear data, are naturally and smoothly connected.

In this embodiment, exponential maps are applied to the post-end frames related to the motion A and the pre-start frames related to the motion B, to calculate the three-dimensional rotation R(t) as rx(t), ry(t), and rz(t). Velocity components are then calculated from the calculated rx(t), ry(t), and rz(t) in each frame period of the post-end frames and the pre-start frames, and the largest value of the absolute value of each velocity component in the post-end frames of the motion A and the pre-start frames of the motion B having a preset timing of execution is extracted as the interpolating velocity v(t) in the period of the transitional motion. As a result, rx(t), ry(t), and rz(t) in each frame of the blended motion data related to the transitional motion can be determined by applying the Poisson's equation to the extracted interpolating velocity v(t).

In the above manner, the motion data of the frame periods inserted between the end posture that is taken according to the motion data related to the motion A and the start posture that is taken according to the motion data related to the motion B are generated through a calculation with linear data. Accordingly, the motion data of the transition from the motion A to the motion B, which contains a three-dimensional rotating action, can be relatively easily generated so that the motion data of the motion A and the motion data of the motion B are naturally and smoothly connected.

Also, the operation to determine rx(t), ry(t), and rz(t) of each of the frames of the blended motion data related to the transitional motion becomes simpler by performing the operation with the Poisson's equation. Moreover, the operation to calculate rx(t), ry(t), and rz(t) of each of the frames of the blended motion data is performed by using only the ith row of the predetermined matrix for the ith velocity components v(t). In this manner, the processing load for the operation can be reduced. Further, exponential maps are applied to transform the non-linear three-dimensional rotation R(t) into the linear rx(t), ry(t), and rz(t), and logarithmic maps are applied to regenerate the three-dimensional rotation R(t). In this manner, the transformation into rx(t), ry(t), and rz(t) and the regeneration of the three-dimensional rotation R(t) can be made relatively easy.

Also, the respective velocity components of the element d(i) with the larger absolute value in each frame are specified as the interpolating velocity v(i) in each frame of the frame periods inserted between the end posture taken according to the motion data related to the motion A and the start posture taken according to the motion data related to the motion B. In this manner, the motion data of the transition from the motion A to the motion B can be generated so that the motion data related to the motion A is naturally and smoothly connected to the motion data related to the motion B.

The data in each frame of the frame periods inserted between the end posture taken according to the motion data related to the motion A and the start posture taken according to the motion data related to the motion B contain data that are generated based on the data most similar to each other between the data of the respective frames contained in the motion data related to the motion A and the data of the respective frames contained in the motion data related to the motion B, or the data with the smallest difference from both of the motion data related to the motion A and the motion data related to the motion B. Accordingly, the motion data of the transition from the motion A to the motion B can be generated so that the motion data related to the motion A is naturally and smoothly connected to the motion data related to the motion B.

The present invention is not limited to the above described embodiment, and various changes and modifications may be made to the embodiment. The following is a description of modifications that can be made to the above described embodiment of the present invention.

In the above described embodiment, the motion A and the motion B that are the actions before and after the transitional motion generation are basic actions. However, a transitional action may be generated for the transition between two different complex actions generated from the basic actions. For example, the present invention can be applied to generation of a transitional motion from a motion A+C formed by combining the motion A and a motion C to a motion B+D formed by combining the motion B and a motion D.

Also, one of the actions before and after the transitional motion generation to generate a transitional action may be a complex action, and the other one of the actions may be a basic action. As a result, the transitional motion is generated not only from basic actions. Accordingly, more diverse transitional motions can be executed, and natural and smooth transitional motions can be executed in accordance with the transition from the former action to the latter action, though the former and the latter actions are not actions stored beforehand in the recording medium 131 or the like.

Further, the present invention can also be applied to a case where the transitional motion of the transition from the motion A to the motion B and the transitional motion of the transition from the motion C to the motion D are generated, and these motions are changed into a motion generated by combining the motion A and the motion C, a motion generated by combining the respective transitional motions, and a motion generated by combining the motion B and the motion D.

In this case, however, the similar frames are not made to have the same timing as in the above described embodiment at the time of generation of the transitional motion of the transition from the motion A to the motion B and at the time of generation of the transitional motion of the transition from the motion C to the motion D, respectively. Instead, the timing for the transitional motion of the transition from the motion A to the motion B and the timing for the transitional motion of the transition from the motion C to the motion D need to be the same.

In the above described embodiment, the transitional motion is generated on the assumption that the motion data of the motion A and the motion data of the motion B both contain an action related to the three-dimensional rotation R(t). However, an action related to such a three-dimensional rotation R(t) may be contained in one of the motions, and may not be contained in the other of the motions.

In the above described embodiment, the largest value of the absolute value of each of the velocity components of each frame is extracted from the post-end frames and the pre-start frames of the motion data related to two different motions, and is used as the interpolating velocity v(t) and as the velocity component of each element applied in the transitional motion. However, the weighted average may be used as the velocity component of each element, or each largest value may be used as the velocity component of each element.

In the above described embodiment, the Poisson's equation is applied to the interpolating velocity v(t), to calculate the respective elements px(t), py(t), pz(t), rx(t), ry(t), and rz(t) related to the three-dimensional position P(t) and the three-dimensional rotation R(t). However, some other matrix operation may be performed, and an operation other than matrix operations may be performed, as long as the operation leads to a result that is as preferable as the result obtained from the Poisson's equation. Still, an operation according to the Poisson's equation is of course applied as a preferred technique in the present invention. Also, only the ith row of the inverse matrix is used to calculate the elements d(i), and thus, the operation is simplified in the above described embodiment. However, the operation may not be simplified.

In the above described embodiment, exponential maps are applied to the three-dimensional rotation R(t), to decompose the three-dimensional rotation R(t) into rx(t), ry(t), and rz(t), which represent independent linear rotations. Logarithmic maps are then applied to rx(t), ry(t), and rz(t), which have been obtained by applying the Poisson's equation. In this manner, the three-dimensional rotation is regenerated. However, some other method may be applied, as long as linear values can be obtained and performed an operation according to the Poisson's equation. Still, the application of exponential maps and logarithmic maps is of course a preferred technique in the present invention.

In the above described embodiment, the case where the present invention is applied to actions of a player character in a three-dimensional video game, is explained as an example. However, the present invention may be applied to actions of a non-player character that is not moved through operations by the player, but is moved through execution of a predetermined processing routine that is unrelated to operations by the player. Also, the present invention can be applied not only to actions of characters but also to actions of other objects such as machines or structural objects, as long as actions of the objects include three-dimensional rotating actions.

In the above described embodiment, the present invention is applied to a video game, and the video game apparatus 100 that is a dedicated game apparatus is used as the terminal apparatus that each player uses to play the game. However, the present invention can also be applied to cases where actions of an object are blended in situations other than video games, as long as the blending is motion blending using three-dimensional computer graphics. If no real-time computer graphics are to be processed, the end posture of the motion A and the start posture of the motion B can be manually set by a user whenever necessary.

The device that performs the motion blending by a method according to the present invention may be a general-purpose personal computer, as long as the apparatus includes the same components as those of the video game apparatus 100. If capable of processing three-dimensional computer graphics, a portable game machine (or a portable telephone device having a function to execute applications) that has a structure including the display device 121 and the sound output device 125 in the housing in which the apparatus body 101 is housed may be used.

As the recording medium 131, a semiconductor memory card can be used, instead of a DVD-ROM or a CD-ROM. A card slot to which this memory card is to be inserted can be provided, instead of the DVD/CD-ROM drive 113. In the case of a general-purpose personal computer, the program and data according to the present invention are not stored in the recording medium 131, but may be stored beforehand in the HDD 107 and be then provided. The recording medium for storing and providing the program and data according to the present invention may be of any type in accordance with the physical form and the form of distribution of the hardware.

In the above described embodiment, the program and data of the video game apparatus 100 are stored in the recording medium 131, and are then distributed. However, the program and data may be stored in a fixed disk device in a server apparatus existing in the network 151, and be distributed to the apparatus body 101 via the network 151. In the video game apparatus 100, the program and data received by the communication interface 115 from the server apparatus can be stored into the HDD 107, and be loaded into the RAM 105 at the time of execution.

REFERENCE SIGNS LIST

100 VIDEO GAME APPARATUS
101 VIDEO GAME APPARATUS BODY
103 CONTROL SECTION
105 RAM
107 HDD
109 SOUND PROCESSING SECTION
111 GRAPHIC PROCESSING SECTION
112 FRAME MEMORY
113 DVD/CD-ROM DRIVE
115 COMMUNICATION INTERFACE
117 INTERFACE SECTION
119 INTERNAL BUS
121 DISPLAY DEVICE
122 DISPLAY SCREEN
125 SOUND OUTPUT DEVICE
131 RECORDING MEDIUM
151 NETWORK
161 INPUT SECTION
162 MEMORY CARD

The invention claimed is:

1. An object operating device that causes an object to perform a second action after performing a first action different from the second action, the object existing in a virtual three-dimensional space, a three-dimensional rotating action being contained in at least one of the first action and the second action, the object operating device comprising:
a motion data storage that stores first motion data formed with data of a plurality of unit times and second motion data formed with data of a plurality of unit times, the first motion data defining the first action, the second motion data defining the second action;

a first motion data setter that sets data of an end point until which the object is made to act in accordance with the first motion data, the data of the end point being of the data of the plurality of unit times forming the first motion data;

a second motion data setter that sets data of a start point from which the object is made to act in accordance with the second motion data, the data of the start point being of the data of the plurality of unit times forming the second motion data;

an interpolating motion data generator that generates motion data, the motion data being data of a plurality of unit times inserted between the end point until which the object is made to act in accordance with the first motion data and the start point from which the object is made to act in accordance with the second motion data; and an object operator that operates the object by using the data of the respective unit times of the first motion data until the end point, the data of the unit times generated by the interpolating motion data generator, and the data of the respective unit times of the second motion data from the start point, wherein the interpolating motion data generator includes:

a rotation specifier that specifies a rotation in a three-dimensional rotating action of the object acting in accordance with the first motion data and a rotation in a three-dimensional rotating action of the object acting in accordance with the second motion data in each unit time of the plurality of unit times inserted between the end point and the start point;

a rotation decomposer that decomposes the rotation specified by the rotation specifier in each unit time of the three-dimensional rotating action of the object acting in accordance with the first motion data into scalar rotations, and decomposes the rotation specified by the rotation specifier in each unit time of the three-dimensional rotating action of the object acting in accordance with the second motion data into scalar rotations, respectively;

a scalar velocity calculator that calculates a scalar velocity in each unit time of the three-dimensional rotating action of the object acting in accordance with the first motion data and a scalar velocity in each unit time of the three-dimensional rotating action of the object acting in accordance with the second motion data, based on the scalar rotations, which are obtained through the decomposition by the rotation decomposer in each unit time when the object acts in accordance with the first motion data, and the scalar rotations, which are obtained through the decomposition by the rotation decomposer in each unit time when the object acts in accordance with the second motion data, respectively;

a scalar velocity specifier that specifies a scalar velocity in each unit time of the three-dimensional rotating action of the object, the scalar velocity being applied in the plurality of unit times inserted between the end point and the start point, based on the scalar velocity calculated by the scalar velocity calculator in each unit time when the object acts in accordance with the first motion data, and the scalar velocity calculated by the scalar velocity calculator in each unit time when the object acts in accordance with the second motion data;

a scalar rotation calculator that calculates scalar rotations regarding the three-dimensional rotating action of the object, the scalar rotations being applied in each unit time of the plurality of unit times inserted between the end point and the start point, by performing a predetermined arithmetic operation on the scalar velocity specified by the scalar velocity specifier in each unit time; and a rotation regenerator that regenerates rotations of the object, the rotations being applied in each unit time of the plurality of unit times inserted between the end point and the start point, based on the scalar rotations calculated by the scalar rotation calculator.

2. The object operating device according to claim 1, wherein the scalar rotation calculator performs a matrix operation as the predetermined arithmetic operation, using a predetermined matrix.

3. The object operating device according to claim 2, wherein the matrix operation using the predetermined matrix is an arithmetic operation by means of the Poisson's equation.

4. The object operating device according to claim 3, wherein, when calculating the scalar rotations to be applied in each unit time of the plurality of unit times inserted between the end point and the start point, the scalar rotation calculator performs the arithmetic operation using only the Xth row in the predetermined matrix for the Xth element of the scalar velocity.

5. The object operating device according to claim 1, wherein the rotation decomposer decomposes the rotation of the three-dimensional rotating action of the object into scalar rotations by using exponential maps, and the rotation regenerator regenerates the rotation of the object based on the scalar rotations by using logarithmic maps.

6. The object operating device according to claim 1, wherein the first action and the second action each contain a three-dimensional rotating action, and the scalar velocity specifier compares the scalar velocity calculated by the scalar velocity calculator in each unit time when the object acts in accordance with the first motion data, with the scalar velocity calculated by the scalar velocity calculator in each unit time when the object acts in accordance with the second motion data, the comparison being made in each corresponding unit time, the scalar velocity having the larger absolute value being specified as the scalar velocity in each unit time in the three-dimensional rotating action of the object, the scalar velocity being applied in the plurality of unit times inserted between the end point and the start point.

7. The object operating device according to claim 1, further comprising:

an approximate data specifier that specifies data of unit times most similar to each other by comparing the data of unit times after the end point of the data of the plurality of unit times forming the first motion data with the data of unit times before the start point of the data of the plurality of unit times forming the second motion data; and a time shifter that causes time shifts to the first motion data and the second motion data in order to match the data of the unit times with each other, the data of the unit times having been specified by the approximate data specifier, wherein the interpolating motion data generator generates the data of the plurality of unit times inserted between the end point until which the object is made to act in accordance with the first motion data and the start point from which the object is made to act in accordance with the second motion data, the data generation being performed based on the first motion data and the second motion data caused the time shifts on each of them by the time shifter.

8. An object operating method for causing an object to perform a second action after performing a first action different from the second action in a computer device, the object existing in a virtual three-dimensional space, a three-dimensional rotating action being contained in at least one of the first action and the second action, the object operating method comprising:

a first step of storing first motion data formed with data of a plurality of unit times and second motion data formed with data of a plurality of unit times beforehand into the computer device, the first motion data defining the first action, the second motion data defining the second action;

a second step of setting data of an end point until which the object is made to act in accordance with the first motion data, the data of the end point being of the data of the plurality of unit times forming the first motion data;

a third step of setting data of a start point from which the object is made to act in accordance with the second motion data, the data of the start point being of the data of the plurality of unit times forming the second motion data;

a fourth step of generating motion data, the motion data being data of a plurality of unit times inserted between the end point until which the object is made to act in accordance with the first motion data and the start point from which the object is made to act in accordance with the second motion data; and a fifth step of operating the object by using the data of the respective unit times of the first motion data until the end point, the generated data of the respective unit times, and the data of the respective unit times of the second motion data from the start point, wherein the fourth step includes:

the step of specifying a rotation in a three-dimensional rotating action of the object acting in accordance with the first motion data and a rotation in a three-dimensional rotating action of the object acting in accordance with the second motion data in each unit time of the plurality of unit times inserted between the end point and the start point, respectively;

the step of decomposing the rotation in each unit time of the three-dimensional rotating action of the object acting in accordance with the first motion data and the rotation in each unit time of the three-dimensional rotating action of the object acting in accordance with the second motion data into scalar rotations, respectively;

the step of calculating a scalar velocity in each unit time of the three-dimensional rotating action of the object acting in accordance with the first motion data and a scalar velocity in each unit time of the three-dimensional rotating action of the object acting in accordance with the second motion data, based on the scalar rotations in each unit time when the object acts in accordance with the first motion data and the scalar rotations in each unit time when the object acts in accordance with second motion data;

the step of specifying a scalar velocity in each unit time of the three-dimensional rotating action of the object, the scalar velocity being applied in the plurality of unit times inserted between the end point and the start point, based on the scalar velocity in each unit time when the object acts in accordance with the first motion data and the scalar velocity in each unit time when the object acts in accordance with the second motion data;

the step of calculating scalar rotations regarding the three-dimensional rotating action of the object, the scalar rotations being applied in in each unit time of the plurality of unit times inserted between the end point and the start point, by performing a predetermined arithmetic operation on the scalar velocity in each unit time; and the step of regenerating a rotation of the object to be applied in each unit time of the plurality of unit times inserted between the end point and the start point, based on the scalar rotations.

9. A tangible computer readable medium that stores a program that causes an object to perform a second action after performing a first action different from the second action in a computer device, the object existing in a virtual three-dimensional space, a three-dimensional rotating action being contained in at least one of the first action and the second action, the program causing the computer device to function as:

a motion data storage that stores first motion data formed with data of a plurality of unit times and second motion data formed with data of a plurality of unit times beforehand into the computer device, the first motion data defining the first action, the second motion data defining the second action;

a first motion data setter that sets data of an end point until which the object is made to act in accordance with the first motion data, the data of the end point being of the data of the plurality of unit times forming the first motion data;

a second motion data setter that sets data of a start point from which the object is made to act in accordance with the second motion data, the data of the start point being of the data of the plurality of unit times forming the second motion data;

an interpolating motion data generator that generates motion data, the motion data being data of a plurality of unit times inserted between the end point until which the object is made to act in accordance with the first motion data and the start point from which the object is made to act in accordance with the second motion data; and an object operator that operates the object by using the data of the respective unit times of the first motion data until the end point, the data of the unit times generated by the interpolating motion data generator, and the data of the respective unit times of the second motion data from the start point, wherein the interpolating motion data generator includes:

a rotation specifier that specifies a rotation in a three-dimensional rotating action of the object acting in accordance with the first motion data and a rotation in a three-dimensional rotating action of the object acting in accordance with the second motion data in each unit time of the plurality of unit times inserted between the end point and the start point;

a rotation decomposer that decomposes the rotation specified by the rotation specifier in each unit time of the three-dimensional rotating action of the object acting in accordance with the first motion data into scalar rotations, and decomposes the rotation specified by the rotation specifier in each unit time of the three-dimensional rotating action of the object acting in accordance with the second motion data into scalar rotations, respectively;

a scalar velocity calculator that calculates a scalar velocity in each unit time of the three-dimensional rotating action of the object acting in accordance with the first motion data and a scalar velocity in each unit time of the three-dimensional rotating action of the object acting in accordance with the second motion data, based on the scalar rotations, which are obtained through the decomposition by the rotation decomposer in each unit time when the object acts in accordance with the first motion data, and the scalar rotations, which are obtained through the decomposition by the rotation decomposer in each unit time when the object acts in accordance with the second motion data, respectively;

a scalar velocity specifier that specifies a scalar velocity in each unit time of the three-dimensional rotating action of the object, the scalar velocity being applied in the plurality of unit times inserted between the end point and the start point, based on the scalar velocity calculated by the scalar velocity calculator in each unit time when the object acts in accordance with the first motion data, and the scalar velocity calculated by the scalar velocity calculator in each unit time when the object acts in accordance with the second motion data;

a scalar rotation calculator that calculates scalar rotations regarding the three-dimensional rotating action of the object, the scalar rotations being applied in each unit time of the plurality of unit times inserted between the end point and the start point, by performing a predetermined arithmetic operation on the scalar velocity specified by the scalar velocity specifier in each unit time; and a rotation regenerator that regenerates rotations of the object, the rotations being applied in each unit time of the plurality of unit times inserted between the end point and the start point, based on the scalar rotations calculated by the scalar rotation calculator.

\* \* \* \* \*